UNITED STATES PATENT OFFICE.

ABIATHAR FISH, JOSEPH P. FISH, AND ERNEST FISH, OF PASADENA, CALIFORNIA.

COMPOSITION OF MATTER USED IN PLASTERING AND DECORATING WALLS.

No. 831,503. Specification of Letters Patent. Patented Sept. 18, 1906.

Application filed December 26, 1905. Serial No. 293,388.

*To all whom it may concern:*

Be it known that we, ABIATHAR FISH, JOSEPH P. FISH, and ERNEST FISH, citizens of the United States, residing at Pasadena, in the county of Los Angeles and State of California, have invented a new and useful Composition of Matter to be Used in Plastering and Decorating Walls, of which the following is a specification.

Our composition consists of the following ingredients, combined in the proportions hereinafter stated and in the manner herein stated. We take eighty parts, in weight, of clean sand finely screened, and to this we add twelve parts, in weight, of coloring-matter. This coloring-matter is sold on the market as coloring-matter or dry paint. To this add five parts, in weight, of gelatin glue. This glue is prepared for use in the manufacture of our plaster as follows: It is first heated in the usual manner in water and when in a liquid state it is put into the sand and coloring-matter and thoroughly mixed. To this mixture is added two parts, in weight, of Irish moss. (A marine alga very common on rocks and stones on the coast of Great Britain and Ireland. It is dried and exposed to sunlight and becomes whitish, and in this condition is known as "Irish moss.") This Irish moss is found on the market in a dry condition, as above described. This Irish moss is first placed in enough water to make a mucilaginous substance. It is then heated and when heated becomes mixed with the water and forms a mucilaginous substance. This mucilaginous substance is properly screened and then put into the mixture, as above. To this mixture is added enough cold water to make a plastic mass and is then thoroughly mixed. It is then placed in drying-vats having a depth of six inches, more or less, after which it is exposed to the air and allowed to dry. In ordinary dry weather it will dry in from three to six days. At the expiration of this time it will be in a cake form. It is then pulverized and placed in packages for the market. Our plaster when in this condition is used as follows: Water is added thereto in quantity sufficient to make a plastic mass, after which it is applied in the same manner that ordinary plaster is applied. The first coat should be allowed to dry from one to two weeks, according to the moisture in the atmosphere, when the second coat is put on in the same manner that a second coat of plaster is put on. It can be given a smooth or sand finish, as desired. The first coat will have the mixture of one part of hair, the finishing-coat not having any. The first coat is not pulverized as finely as the finishing-coat. The proportions of coloring-matter may vary from the above to produce different shades of coloring.

The ingredients of our composition are as follows: clean sand, eighty parts; coloring-matter, twelve parts; gelatin glue, five parts; Irish moss, two parts; hair, one part. To these ingredients is added enough water to form a plastic mass, as above described.

What we claim, and desire to secure by Letters Patent, is—

1. The herein-described composition of matter consisting of water, sand, coloring-matter, glue, Irish moss and hair, substantially as described and for the purpose specified.

2. The herein-described composition of matter for plastering consisting of clean sand eighty parts, coloring-matter twelve parts, gelatin glue five parts, Irish moss two parts, hair one part and water in sufficient quantity, substantially as described.

3. The herein-described composition of matter consisting of water, sand, coloring-matter, glue, and Irish moss, substantially as described and for the purpose specified.

In witness that we claim the foregoing we have hereunto subscribed our names this 19th day of December, 1905.

ABIATHAR FISH.
              JOSEPH P. FISH.
              ERNEST FISH.

Witnesses:
  HENRY T. HAZARD,
  G. E. HARPHAM.